Patented July 14, 1953

2,645,587

UNITED STATES PATENT OFFICE 2,645,587

METHOD OF MAKING LIGNOCELLULOSE PRESSURE MOLDED ARTICLE

Robert V. Williamson, Peoria, Ill., assignor to the United States of America as represented by the Secretary of Agriculture No Drawing. Application July 25, 1950, Serial No. 175,849

6 Claims. (Cl. 106—200)

(Granted under Title 35, U. S. Code (1952), sec. 266)

The invention herein described may be manufactured and used by or for the Government of the United States of America for governmental purposes throughout the world without the payment to me of any royalty thereon.

This invention relates to novel plastic materials, such as boards, sheets, tile, slabs, blocks and the like, containing a lignocellulosic material as a major component. More particularly, this invention relates to novel plastic materials possessing desirable strength characteristics and surprising resistance to moisture as exemplified by a maximum of dimensional stability when exposed to water or to moist environments. This invention relates moreover to a novel heat treated lignocellulose filler for molding compositions.

According to my invention, I have discovered that lignocellulosic material may be treated in such a manner that its normal propensity for absorbing water and swelling is reduced surprisingly. According to my discovery, agricultural residues, and like lignocellulosic materials are heated in a bone dry condition in the essential absence of atmospheric air or oxygen to temperatures within the range of 200° to 300° C. This heat treatment results in a partial destructive distillation of the material and also effects a modification so that the treated material possesses novel water-resistant properties.

The length of time of the heating treatment should encompass the period over which the heated material evolves an appreciable amount of gases at those temperatures. When the evolution of gases, i. e., smoking or fuming of the material ceases, the heating step is complete and the material may then be utilized as an ingredient in molding compositions characterized by unusually low resin or bonding agent content. The lignocellulose material may be nut shells, straw, rice hulls, corncobs, peanut shells, bagasse, flax shives, and the like. For most molding compositions the material should be in finely divided form, although extremely fine particles are not necessary. An outstanding feature of my discovery is that lignocellulose, so treated, may comprise 75 percent or more of plastic products having water absorption which is even lower than that characterizing general purpose plastics that contain 50 percent expensive resin binder.

The invention may be carried out by incorporating the heat treated material in a molding composition. Any suitable bonding agent, such as thermoplastic resins, thermosetting resins, glue, and the like, may be employed to bind the material. Moreover, molded shapes may be manufactured by any of the conventional molding procedures, such as compression molding, injection molding or extrusion molding.

The invention will be described with reference to molded objects produced by the compression molding of thermoplastic compositions. It is to be understood, nevertheless, that this particular kind of molding technique is intended to be illustrative only.

I may incorporate the untreated lignocellulosic material in a plastic composition, by mixing the finely divided material with the thermoplastic bonding agent, removing moisture, if necessary, and heating the mixture in the absence of air to a temperature within the specified range until smoking ceases. The treatment usually results in a loss in weight of about 10 to 20 percent of the composition. The heat treated composition is then molded into the desired shape, preferably while still hot. Hot molding tends to eliminate drastic cooling effects, but the molding temperature should be substantially lower than that used for the heat treatment. If the molding is carried out at substantially the same temperature as the heat treatment, cracks and strains due to the effect of incompletely evolved gases result.

The above method of molding is preferred because it has certain economic advantages, but alternatively the lignocellulose may be heat treated alone and subsequently mixed with bonding agents and molded.

The critical temperature for the heat treatment for any specific lignocellulose composition lies within the range already stated, and the desirable properties are imparted to a great degree by operating within this range. There is some variation within the range, however, for optimum results of maximum yields and maximum resistance to moisture, depending upon the specific lignocellulose material and the size and shape of the particles. I have found that optimum yields may be obtained for any specific material by heating to a temperature, within the stated range, at which appreciable smoking or fuming starts. This temperature should be maintained throughout the treatment.

As binder in the thermoplastic type of my products, I may use any thermoplastic resin, stable at my heat treating temperatures. Examples of such resins are Vinsol (see U. S. Patent 2,412,652), rosin, ester gum, Chinawood oil, polyamide resins and the like. The amount of thermoplastic binder may vary over a wide range. For non-resinous lignocellulose materials it may vary from about 12 percent up to 35 percent or more.

For material containing natural resins, the minimum amount for moldability may be as low as 10 percent. For economic reasons the minimum for moldability is preferred.

During the heat treatment a partial destructive distillation occurs as previously described. Apparently the chemical groups in the lignocellulose material which are normally responsible for water absorption and swelling are modified by the high temperature treatment. The resistance to the action of water which characterizes the products of this invention is especially outstanding in view of the high ratios of lignocellulose material in the products.

to cool for nine minutes. The physical test results of test specimens from these experiments are summarized in Table I.

In the molding step the freshly treated hot materials were placed substantially immediately into the press. The press was then closed under only sufficient pressure to hold the hot mold in contact with the relatively cool platens of the press for a period of 15 to 30 seconds in order to reduce somewhat the temperature of the composition. This was done for the purpose of stopping the further production of volatile gases in the mold. The full molding pressure was then applied.

Table I

| Ex. No. | Composition | | | Flexural strength, Lbs./sq. in. | Impact strength | | Percent Water absorption, 24 hours | Percent Swelling, 24 hours | | | Percent Yield of board basis weight of dry material charged in mold |
|---|---|---|---|---|---|---|---|---|---|---|---|
| | Lignocellulose | Percent | Vinsol Percent | | Flat, Ft. lbs./sq. in. | Edge, Ft. lbs./sq. in. | | Length | Width | Thickness | |
| 1 | Rice hulls | 75 | 25 | 2,320 | 0.35 | 0.44 | 0.10 | 0.00 | 0.00 | 0.00 | 81 |
| 2 | Black walnut shells | 75 | 25 | 1,930 | 0.49 | 0.50 | 0.49 | 0.00 | 0.00 | 0.00 | 80 |
| 3 | Corncobs | 75 | 25 | 2,340 | 0.47 | 0.31 | 0.22 | 0.00 | 0.00 | 0.00 | 72 |
| 4 | Peanut shells | 75 | 25 | 2,570 | 0.43 | 4.2 | 0.40 | 0.06 | 0.00 | 0.00 | 83 |
| 5 | Wheat straw | 75 | 25 | 3,320 | 0.68 | 1.29 | 0.30 | 0.00 | 0.00 | 0.00 | 79 |
| 6 | Bagasse fines | 75 | 25 | 3,540 | 0.40 | 2.70 | 0.35 | 0.00 | 0.00 | 0.00 | 83 |
| 7 | Flax shives (Calif.) | 75 | 25 | 3,750 | 0.90 | 0.66 | 0.56 | 0.00 | 0.20 | 0.00 | 81 |

The molded products are characteristically dark colored and possess a smooth surface. The dry flexural strength is of the order of 2500 p. s. i. and higher. The outstanding property, however, is their high resistance to water.

The wet flexural strength of the products of this invention is not reduced materially after soaking the molded product in water for 24 hours. As previously explained, this advantage is in addition to high dimensional stability of the products. The products absorb only a small fraction of 1 percent of water after such treatment.

The advantageous properties described in the foregoing paragraphs characterize thermoplastic type compositions in particular but are, nevertheless, substantially fully realized regardless of the general type of molding technique employed and the general type of binder used. It should be understood, nevertheless, that the molded products possess properties affected to some extent by the nature of the binding material, for example a minimum water absorption and dimensional stability requires resinous bonding materials which are not themselves affected by water.

For the thermoplastic, compression molded type of product, Vinsol is preferred as the bonding agent, due largely to its relative low cost. It produces an excellent product having a wide variety of uses, both structural, protective and ornamental.

The following experimental data illustrates the invention.

Various proportions of dry lignocellulose materials, comminuted or ground to pass a 20-mesh screen, and Vinsol, as shown in Table I, were thoroughly mixed and the compositions were heated to 260–265° C. for 1 to 2 hours until smoking ceased. The treated compositions were then molded in a press in which the platens were heated to about 100° C. with steam. The molding was carried out at a pressure of 2000 p. s. i. applied for one minute, whereupon the pressure was reduced and the molded specimen permitted In place of Vinsol, I may use other thermoplastic binders, such as rosin, ester gum, polyamide resins and the like, or mixtures thereof. Likewise similar products high in water resistance may be made by injection or extrusion molding. It has furthermore been found that articles such as flat board articles may be given novel and pleasing coatings of foil, film and the like by lining the molds with tin foil, cellophane and similar material.

As previously stated, the optimum conditions for heat treatment vary slightly within the stated critical temperature range. In the following examples, instead of employing an arbitrary temperature within the range, the compositions were heated until appreciable smoking or fuming occurred. The temperature was determined at this point, and was maintained throughout the treatment, i. e., until smoking or fuming substantially ceased. The results are summarized in Table II. Comparison of the two tables shows that the yield of board for straw and rice hulls is considerably increased. The temperature in each instance was approximately 230° C. for the heat treatment. This method of operating at the optimum condition is a relatively simple one, for it requires merely the observation of the initial occurrence of appreciable smoking and the maintenance of that temperature throughout the treatment. This particular technique is of value when manufacturing molded articles of one particular lignocellulose material. Of course, a long plant run can be carried out using automatic controls once the optimum conditions have been determined.

As can be seen from Table II, the conditions for optimum yield result in slightly increased water absorption and a slight amount of swelling compared with the corresponding products in Table I. Compared with similar products of the prior art, however, these products shown in Table II are quite outstanding, and the increased yield amply compensates for these small increases in any use to which products of this type are likely to be put.

Table II

| Ex. No. | Composition | | | Flexural strength, Lbs./sq. in. | Impact strength | | Percent Water absorption, 24 hours | Percent Swelling, 24 hours | | | Percent Yield of board basis weight of dry material charged in mold |
|---|---|---|---|---|---|---|---|---|---|---|---|
| | Lignocellulose | Percent | Vinsol, percent | | Flat, Ft. lbs./sq. in. | Edge, Ft. lbs./sq. in. | | Length | Width | Thickness | |
| 8 | Rice hulls | 75 | 25 | 2,080 | 0.38 | 0.42 | 0.69 | 0.12 | 0.12 | 0.44 | 93 |
| 9 | Wheat straw | 75 | 25 | 2,420 | 0.41 | 0.36 | 0.44 | 0.00 | 0.02 | 0.22 | 88 |

Having thus described my invention I claim:

1. The method comprising subjecting a dry mixture of fibrous lignocellulose material with a thermoplastic binder, the mixture containing from about 75 to about 90% fibrous lignocellulose to heat treatment in the substantial absence of oxygen at a temperature within the range of 200° to 300° C., thus to cause evolution of smoke, maintaining the temperature within said range while excluding oxygen until the evolution of appreciable smoke ceases, said mixture remaining in solid state throughout said treatment, and pressure molding the thus treated mixture at a temperature below the heat treatment.

2. The method of claim 1 in which the lignocellulose material is rice hulls.

3. The method of claim 1 in which the lignocellulose material is comminuted rice hulls and the binder is Vinsol.

4. The method of claim 1 in which the lignocellulose is comminuted corncobs and Vinsol.

5. The method of claim 1 in which the lignocellulose material is comminuted peanut shells and Vinsol.

6. The method of claim 1 in which the lignocellulose material is comminuted wheat straw and Vinsol.

ROBERT V. WILLIAMSON.

References Cited in the file of this patent

UNITED STATES PATENTS

| Number | Name | Date |
|---|---|---|
| 1,044,126 | Bost | Nov. 12, 1912 |
| 1,285,888 | Allen | Nov. 26, 1918 |
| 2,319,182 | Van der Pyl | May 12, 1943 |
| 2,340,956 | Gillette | Feb. 8, 1944 |
| 2,381,269 | Elmendorf et al. | Aug. 7, 1945 |
| 2,412,652 | Rosenthal | Dec. 17, 1946 |
| 2,413,326 | Kressman et al. | Dec. 31, 1946 |

FOREIGN PATENTS

| Number | Country | Date |
|---|---|---|
| 43,515 | Germany | Dec. 3, 1907 |